US007998329B2

(12) United States Patent
Shiota et al.

(10) Patent No.: US 7,998,329 B2
(45) Date of Patent: Aug. 16, 2011

(54) POROUS NICKEL FOIL FOR NEGATIVE ELECTRODE OF ALKALINE BATTERY, PRODUCTION METHOD THEREFOR AND PRODUCTION DEVICE THEREFOR

(75) Inventors: Toshiaki Shiota, Kyoto (JP); Ryoichi Noumi, Mino (JP); Kunihiro Fukui, Kobe (JP); Masanari Kimoto, Kawanishi (JP)

(73) Assignee: Panasonic Corporation, Osaka (JP)

( * ) Notice: Subject to any disclaimer, the term of this patent is extended or adjusted under 35 U.S.C. 154(b) by 1751 days.

(21) Appl. No.: 10/436,479

(22) Filed: May 13, 2003

(65) Prior Publication Data
US 2004/0226825 A1    Nov. 18, 2004

Related U.S. Application Data

(63) Continuation of application No. PCT/JP00/08004, filed on Nov. 13, 2000.

(51) Int. Cl.
*C25D 1/00* (2006.01)
(52) U.S. Cl. .......................................................... 205/76
(58) Field of Classification Search .................... 205/50, 205/57, 60, 67, 76
See application file for complete search history.

(56) References Cited

U.S. PATENT DOCUMENTS 5,374,491 A * 12/1994 Brannan et al. ............... 429/235
6,153,077 A * 11/2000 Kato et al. ........................ 205/77

FOREIGN PATENT DOCUMENTS

| JP | 53-33332 | 3/1978 |
| JP | 53-103543 | 9/1978 |
| JP | 57-54558 | 11/1982 |
| JP | 61-163569 | 7/1986 |
| JP | 8-100288 | 4/1996 |
| JP | 63-128192 | 5/1998 |
| JP | 10-188994 | 7/1998 |
| JP | 11-297331 | 10/1999 |
| JP | 2000-228201 | 8/2000 |
| JP | 2000-285926 | 10/2000 |
| JP | 2001085015 A * | 3/2001 |

OTHER PUBLICATIONS

United States Office Action issued in U.S. Appl. No. 11/339,441 dated Oct. 22, 2009.

* cited by examiner

*Primary Examiner* — Luan Van
(74) *Attorney, Agent, or Firm* — McDermott Will & Emery LLP

(57) ABSTRACT

A porous nickel foil for a negative electrode of an alkaline battery formed by an electrolytic deposition method, wherein the porous nickel foil is flexible and has a thickness of 10-35 μm and a Vickers hardness of 70-130. An electrodeposition drum for producing porous metal foil by an electrolytic deposition method including a drum having a surface onto which metal foil is deposited, a plurality of holes formed in the surface and an insulating resin filled in the holes, wherein the ratio of depth L and diameter D (L/D) of the hole is at least 1 and no clearance, into which deposited metal otherwise cuts in a wedge shape, exists at the boundary between the insulating resin filled in the hole and an opening edge of the hole.

2 Claims, 7 Drawing Sheets

Prior art

FIG. 6B (Enlarged view of part A)

FIG. 6C

FIG. 6D (Enlarged view of part C)

FIG. 7A

FIG. 7B (Enlarged view of part A)

FIG. 7C

FIG. 7D (Enlarged view of part C)

POROUS NICKEL FOIL FOR NEGATIVE ELECTRODE OF ALKALINE BATTERY, PRODUCTION METHOD THEREFOR AND PRODUCTION DEVICE THEREFOR

This application is a Continuation of International Application No. PCT/JP00/08004, filed Nov. 13, 2000, the disclosure of which Application is incorporated by reference herein in its entirety.

TECHNICAL FIELD

The present invention relates to porous nickel foil (a current collector) for a negative electrode of an alkaline battery and a production method therefor. The present invention further relates to a drum used as a cathode for producing porous metal foil by an electrolytic deposition method (hereinafter referred to as an electrodeposition drum or simply as a drum). The porous metal foil signifies metal foil provided with a plurality of small apertures arranged in a predetermined pattern. With the use of the porous nickel foil of the present invention as the negative electrode of the alkaline battery, the capacity of the battery can be increased.

BACKGROUND ART

In recent years, portable electronic equipment is continually being downsized, while simultaneously being more highly advanced. Typically, such portable electronic equipment utilize a small secondary battery (a storage battery) as a driving power source. Typically, the secondary battery includes a lithium ion battery and a nickel-metal hydride battery.

The nickel-metal hydride battery is a battery of high energy density made of a positive electrode of a porous nickel substrate coated with nickel hydroxide paste and a negative electrode of a hydrogen absorbing alloy. With the progress in size reduction and performance of the portable electronic equipment, enhancement of the storage battery performance is constantly being required. The enhancement of the storage battery performance means an increase in output and battery capacity.

As means of increasing the battery capacity, there are methods of ① increasing the size (volume) of the storage battery, ② improving the performance of an active material (hydrogen absorbing alloy), ③ increasing the filling amount of the active material and ④ reducing the volume of battery components.

As measures for the above-described methods of ③ increasing the filling amount of the active material and ④ reducing the volume of the battery components, negative electrodes improved in various ways have been proposed (for example, see Japanese Examined Patent Publication No. SHO 58-46827, Japanese Laid-Open Patent Publication No. SHO 53-33332, Japanese Laid-Open Patent Publication No. SHO 61-163569 and Japanese Laid-Open Patent Publication No. HEI 10-188994).

The negative electrode of the nickel-metal hydride battery is formed by applying the active material in the slurry form onto both surfaces of porous metal foil (a core material), drying at about 100° C., followed by press-bonding using rollers. This production method is adopted to increase the filling density of the active material, and at the same time, to enhance adhesion (adherability) between the active material and the porous metal foil.

So far, nickel-plated steel foil having a plurality of small apertures and a thickness of about 60-80 µm has been used as the above-described porous metal foil for the core material. The nickel-plated steel foil is formed by making a steel plate into steel foil of 50-70 µm thick by cold rolling, boring therein a plurality of small apertures using a press boring apparatus (a punching machine) and nickel plating on the surface thereof (see Japanese Laid-Open Patent Publication No. SHO 61-163569).

For the purpose of increasing the energy density of the battery, there has been proposed an alkaline storage battery using, as the core material of the negative electrode, porous nickel-plated steel foil having the whole thickness (total thickness of the base steel foil and the plated layer) of 20-50 µm thick or the porous steel foil subjected to heat treatment to give tensile strength and malleability (see Japanese Laid-Open Patent Publication No. HEI 10-188994). The harder the porous steel foil is, the better the aperture shape becomes in boring (punching) the apertures, and the punching can be carried out at high speed. However, if the active material is applied and press-bonded after the nickel plating, only a small amount of the active material is adhered to the foil (i.e., the adherability of the active material becomes poor). Therefore, the punching is carried out after rolling and then the nickel-plating is performed, followed by softening or annealing.

In order to form the steel foil which serves as the base material of the above-described porous nickel-plated steel foil having the whole thickness of 20-50 µm, a large amount of energy is required for the rolling. Further, cost increase due to yield reduction is inevitable. If the porous nickel-plated steel foil is subjected to the softening or annealing, the adhesion (adherability) of the active material increases, but the tensile strength decreases. Therefore, the foil may possibly be torn in a press-bonding step after the application of the active material or during transfer in a process of assembling the foil into the battery.

On the other hand, an electrolytic deposition method is the most rational method for manufacturing the porous metal foil as thin as 35 µm or less.

Figure 1:
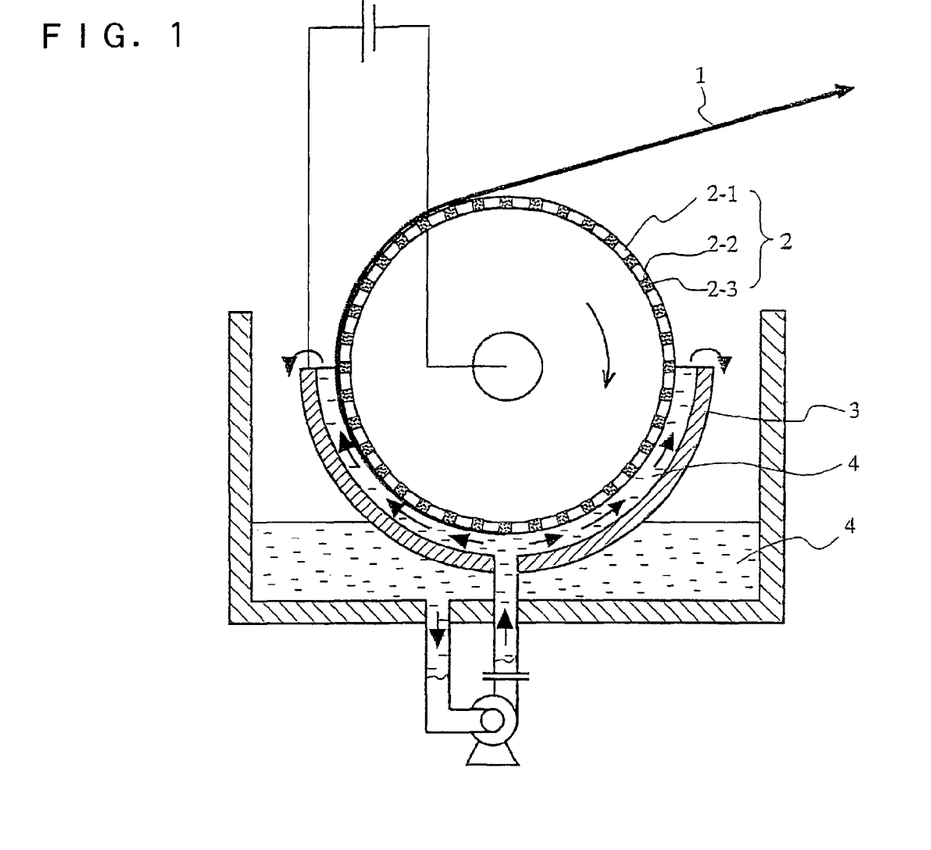
FIG. 1 is a conceptual diagram of an electrolytic deposition apparatus for producing continuous metal foil using an electrodeposition drum.

FIG. 1 is a diagram illustrating the principle of the electrolytic deposition method. Hereinafter, explanation is given by way of an example of the production of nickel foil. According to this method, an electrodeposition drum 2 to be a cathode and a semi-circle anode 3 made of nickel are arranged at a predetermined interval, an electrolyte 4 is flown therebetween and electric current is passed while rotating the electrodeposition drum 2. Then, nickel is electrodeposited lightly onto the surface of the electrodeposition drum 2, which is peeled off to collect as nickel foil 1.

Figure 2:
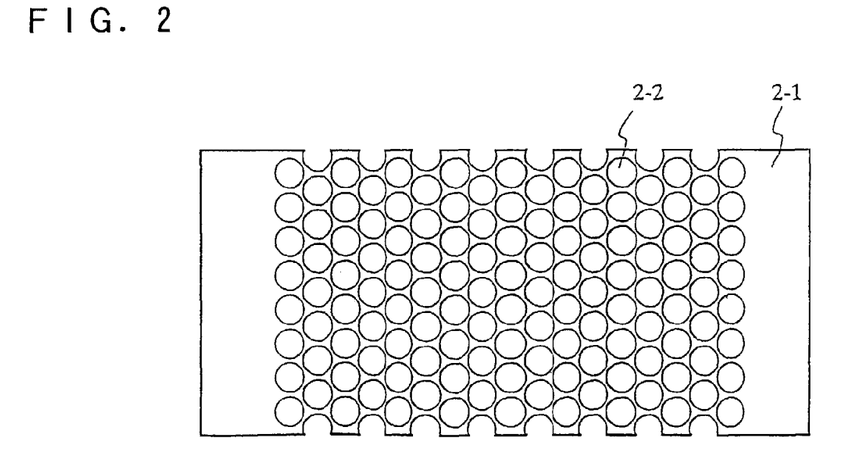
FIG. 2 is an illustration of an exemplary surface of the electrodeposition drum used in the electrolytic deposition method.
Figure 6A:
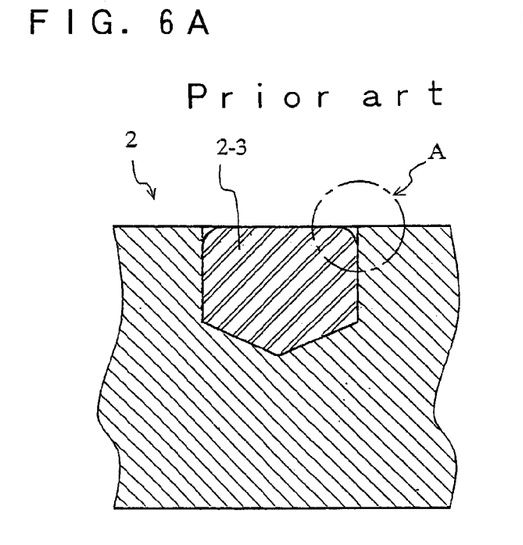
FIG. 6A is an enlarged vertical section of a hole of a conventional electrodeposition drum.

The above-described electrodeposition drum 2 is made of a material that is insoluble to the electrolyte 4 such as titanium. As shown in FIG. 2 (a partial development of the drum surface), a plurality of holes 2-2 of 1-2 mm diameter are provided on the periphery of a base material 2-1. Further, as shown in FIG. 6A, the holes 2-2 are filled with an insulating resin 2-3. Therefore, nickel is not electrodeposited on the holes 2-2 and the resulting nickel foil 1 becomes porous.

According to the above-described method, in principle, the porous metal foil is formed continuously. However, there are significant problems to be solved before placing this technique into practical use. One of the problems is that the resin 2-3 adheres to the deposited metal foil (nickel foil) 1 when peeling the foil off the electrodeposition drum 2 and separates from the hole 2-2. Then, electrolytic deposition occurs in the hole 2-2 (on the inner surface thereof) where metal must not be electrodeposited, which makes impossible to form the porous metal foil. Another problem is that the metal foil (nickel foil) 1 is apt to be torn when peeling. Especially in the case of ultra-thin foil or foil having a large aperture rate, the peeling from the electrodeposition drum 2 cannot be carried out properly, which may often tear the foil.

With respect to the above-described separation of the resin, Japanese Laid-Open Patent Publication No. HEI 8-100288 discloses a solution. In this method, cold water is poured onto the drum surface immediately after the drum is taken out of the electrolyte to reduce an adhesion force between the metal foil and the drum (resin). However, the effect is doubtful. Even if the method is effective, it is disadvantageous in that the composition and temperature of the electrolyte may be changed by the cooling water and the conditions for the electrolytic deposition may vary.

DISCLOSURE OF INVENTION

A first object of the present invention is to provide porous nickel foil used as a core material for forming a negative electrode of an alkaline battery, which is thin, excellent in adhesion with the active material and is not easily torn while being transferred during press-bonding of the active material.

A second object of the present invention is to provide a drum that allows continuous production of the porous metal foil in the electrolytic deposition method and peeling of the deposited metal foil, without breakage of the foil and separation of the resin filled in the holes of the drum when peeling the metal foil deposited on the cathode drum.

The inventors of the present invention have performed various experiments on the porous metal foil to achieve the above-described first object and recognized that the adhesion of the active material is improved by adjusting the hardness of the porous nickel foil (electrodeposited nickel foil) to the same level as the steel foil even if the thickness remained small. Thus, the following first and second inventions have been completed.

The first invention relates to porous nickel foil for the negative electrode of the alkaline battery as described in (1) below and the second invention relates to a method of producing the porous nickel foil as described in (2) below.

(1) Porous nickel foil for a negative electrode of an alkaline battery formed by an electrolytic deposition method, wherein the porous nickel foil is flexible and has a thickness of 10-35 μm and a Vickers hardness of 70-130.

(2) A method for producing porous nickel foil for a negative electrode of an alkaline battery comprising the steps of producing porous nickel foil of 10-35 μm thick by an electrolytic deposition method and softening or annealing the porous nickel foil such that the porous nickel foil has a Vickers hardness of 70-130.

Further, the inventors of the present invention have conducted research to achieve the above-described second object and found that the cathode drum used for the electrolytic deposition is the cause of the problems of separation of the resin from the holes of the cathode drum and the breakage of the metal foil. Then, a detailed study was performed on the structure of the holes of the drum surface and the resin to be filled in the holes, and the result was the following third invention.

The third invention relates to a production device for porous metal foil as described in (3) below.

(3) An electrodeposition drum for producing porous metal foil by an electrolytic deposition method comprising a drum having a surface onto which metal foil is deposited, a plurality of holes formed in the surface and an insulating resin filled in the holes, wherein the ratio of depth L and diameter D (L/D) of the hole is at least 1 and no clearance (i.e., opening), into which deposited metal otherwise cuts (i.e., fills-in) in a wedge shape, exists at the boundary between the insulating resin filled in the hole and an opening edge of the hole.

The insulating resin filled in the above-described drum hole is preferably a resin that does not separate from the inner wall of the hole by shrinkage during curing. A typical example thereof is a silicone resin.

BEST MODE FOR CARRYING OUT THE INVENTION

First, referring to the above-described FIG. 1, a detailed explanation of the first and second inventions is provided.

As described above, the porous nickel foil 1 is produced by depositing nickel from the electrolyte 4 onto the surface of the electrodeposition drum 2 using the porous electrodeposition drum 2 made of titanium as a cathode and a semi-circle electrode 3 as an anode, and then peeling the deposited matter. The electrolyte 4 may be a known bath used for nickel plating, for example, a Watts bath and a sulfamic acid bath. To these baths, may be added as required additives such as saccharin, para-toluenesulfonamide, sodium benzenesulfonate and sodium naphthalenetrisulfonate and commercially available additives, which are formulations thereof.

In order that the porous nickel foil serves as a core material to support the active material press-bonded thereto and functions as an electrode to pass electric current through, the porous nickel foil has a thickness of about 10-35 μm. The thinner the porous nickel foil is, the smaller the battery volume becomes, and the degree of the adhesion of the active material increases. Therefore, the thickness is preferably smaller to increase the battery capacity. In the electrolytic deposition method using the drum, the thickness of the foil is adjusted by controlling the rotation speed of the drum or the current density.

The porous nickel foil requires flexibility to increase the adherability of the active material. In terms of a Vickers hardness, 130 or less is required. When the Vickers hardness exceeds 130, the adhesion (adherability) of the active material is reduced, which causes separation of the active material during charge and discharge in use of the battery. Accordingly, a high capacity storage battery cannot be obtained. A preferable hardness is 120 or less in terms of the Vickers hardness. In some cases, the porous nickel foil cannot be sufficiently flexible if it is left unchanged after the electrolytic deposition. In this case, the nickel foil is subjected to softening or annealing by heating to 450-900° C. to reduce the hardness.

The application of the active material to the porous nickel foil is carried out in the same manner as the case of using the porous nickel-plated steel foil. For example, with long foil fed over rollers continuously, the active material in the slurry form is applied to the foil surface by a roller coating method or a doctor blade method and is dried at about 100° C., followed by press-bonding using a pair of upper and lower rollers (see FIGS. 3 and 4). Accordingly, the nickel foil requires enough strength not to break while being transferred. A measure of the strength is 70 or more in terms of the Vickers hardness.

The porous nickel foil of the present invention is formed with a plurality of apertures by the electrolytic deposition, which eliminates the need of boring (punching) the apertures. Further, the thickness of the foil can be adjusted by simply changing the conditions for the electrolytic deposition, which allows production of foil thinner than the nickel-plated steel foil.

Figure 3A:
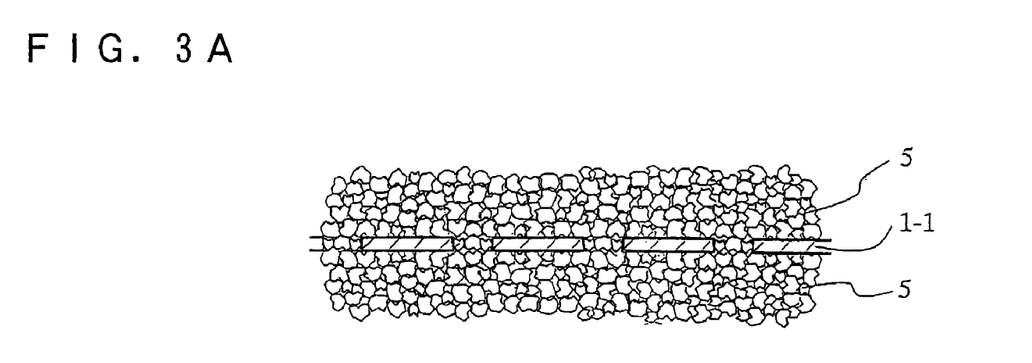
FIG. 3A is a diagram illustrating a state where an active material is applied to a thin foil.
Figure 3B:
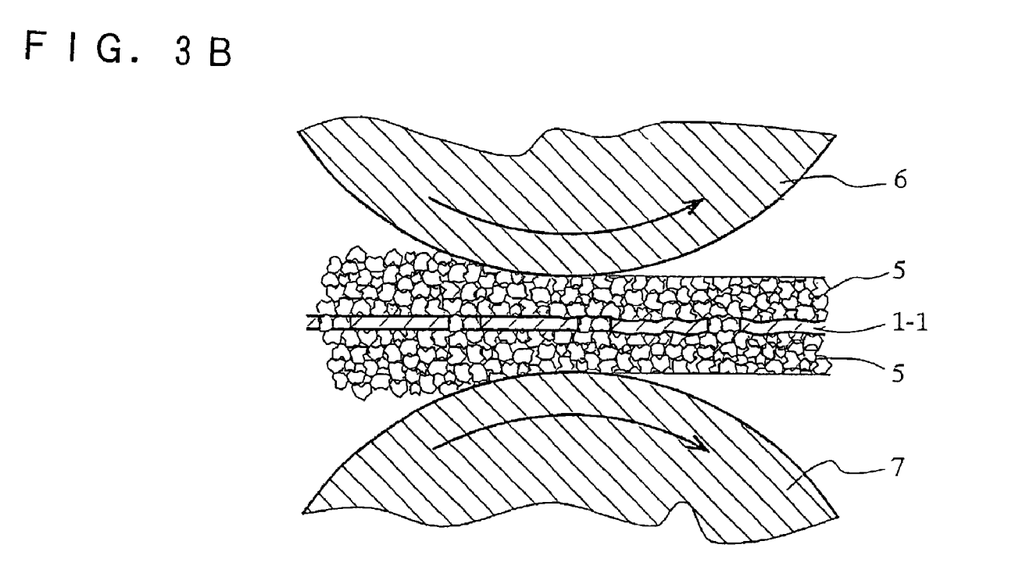
FIG. 3B is a diagram illustrating a state where the active material is being press-bonded by rollers.
Figure 4A:
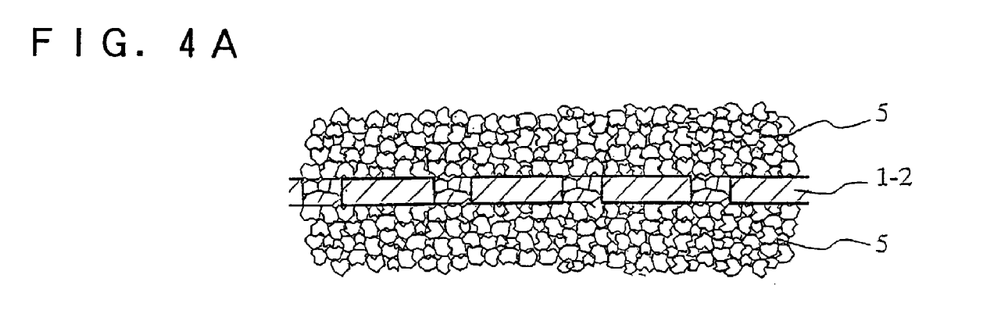
FIG. 4A is a diagram illustrating a state where an active material is applied to a thick foil.
Figure 4B:
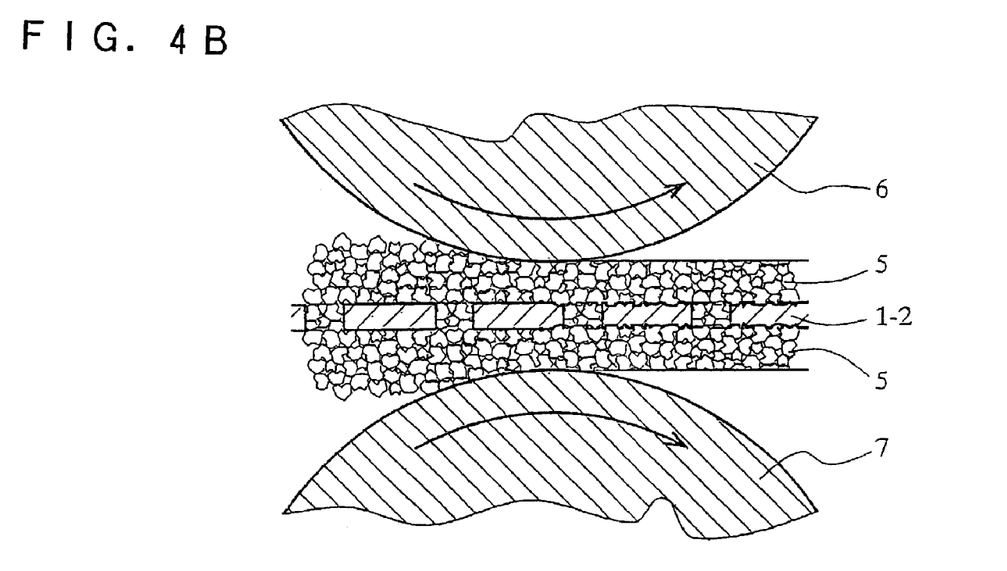
FIG. 4B is a diagram illustrating a state where the active material is being press-bonded by rollers.

FIGS. 3 and 4 are diagrams illustrating a relationship between the thickness of the porous nickel foil and the adherability of the active material. FIGS. 3A and 3B illustrate the case where a thin foil 1-1 is used, among which FIG. 3A shows the state where an active material 5 is applied and FIG. 3B depicts the state where the active material 5 is being press-bonded by upper and lower rollers 6 and 7. FIGS. 4A and 4B illustrate the case where a thick foil 1-2 is used, among which FIG. 4A shows the state where the active material 5 is applied and FIG. 4B depicts the state where the active material is being press-bonded by the upper and lower rollers 6 and 7.

The porous nickel foil 1-1 of 10-20 µm thick can be subjected to the press-bonding of the active material 5 after the electrolytic deposition. Since the thickness is small as shown in FIG. 3B, the nickel foil 1-1 itself is deformed, thereby enhancing the ability to support the particles of the active material 5. Where the thickness is small, it is preferable to use a relatively hard (highly strong) foil that is left unchanged after the electrolytic deposition to prevent a break while being transferred on the rollers. On the other hand, the porous nickel foil 1-2 of 20-35 µm thick supports the active material 5 with plastic deformation in the thickness direction of the foil 1-2 as shown in FIG. 4B. For this reason, the porous nickel foil 1-2 is preferably soft. Therefore, the electrodeposited foil 1-2 is preferably subjected to softening or annealing. If the porous nickel foil 1-2 has a thickness of 20-35 µm, a decrease in strength due to the softening can be compensated by the thickness, so that the foil is not torn during transfer in the manufacturing process.

Figure 5:
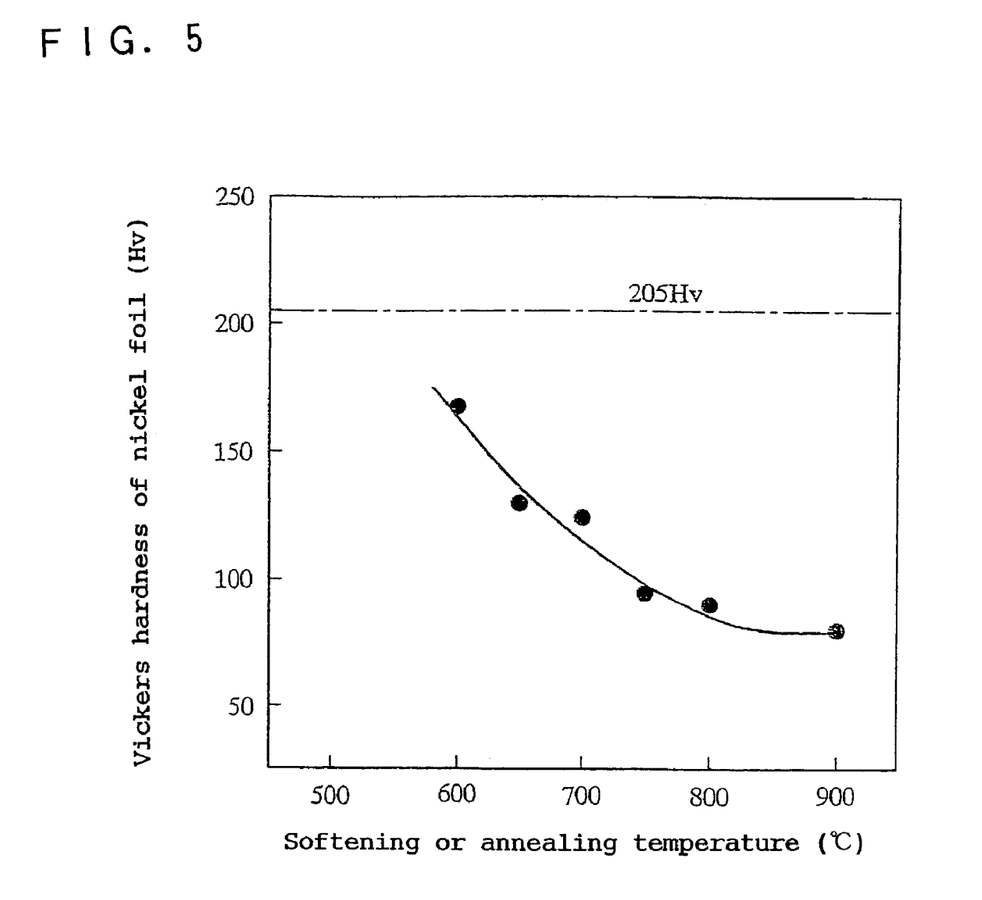
FIG. 5 is a graph illustrating a relationship between heat treatment temperature and a Vickers hardness in heat-treating electrodeposited nickel foil having a Vickers hardness of 205.

FIG. 5 is a graph illustrating a relationship between softening or annealing temperature and a hardness of the nickel foil. As apparent from FIG. 5, the hardness of the nickel foil is reduced as the heat treatment temperature is raised. The hardness decreases to as low as about 80 in terms of the Vickers hardness at 900° C. Data shown in FIG. 5 were obtained by the following experiments.

As an electrolyte (pH: 3.5, temperature: 50° C.), a Watts bath added with ACNA-HSB (a product of OKUNO CHEMICAL INDUSTRIES CO., LTD.) was used. Electrolysis was carried out at a current density of 35 A/dm$^2$ and a drum rotation speed of 11.2 cm/min to produce nickel foil having a hardness of 205 in terms of the Vickers hardness and a thickness of 35 µm. The obtained nickel foil was subjected to heat treatment in a hydrogen reduction furnace (atmosphere: 10% $H_2+N_2$) at atmospheric temperature varied between 600-900° C. At that time, the temperature was raised at the rate of 10° C./min. The electrolyte was maintained at a predetermined temperature for 10 minutes and quenched with $N_2$ gas.

Next, explanation of the third invention is given.

Figure 6B:
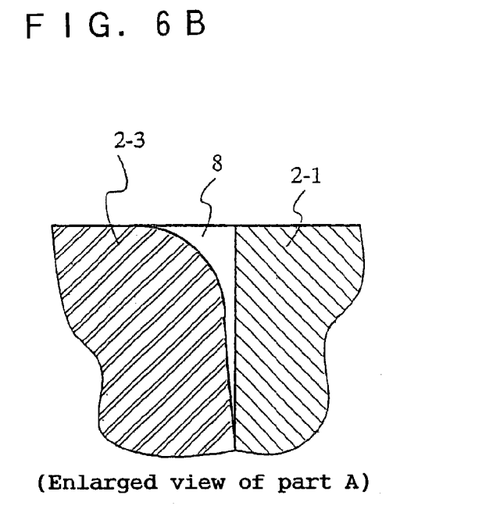
FIG. 6B is an enlarged view of part A shown in FIG. 6A.
Figure 6C:
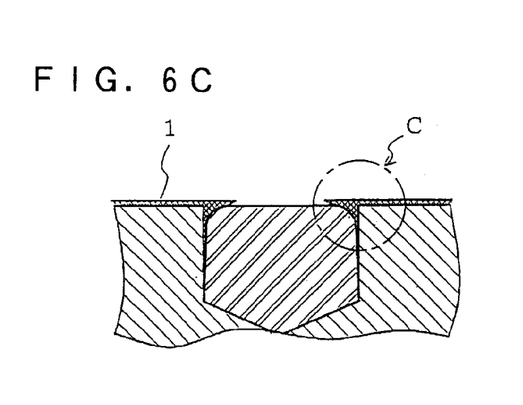
FIG. 6C is an enlarged vertical section illustrating a state where metal foil is deposited on the drum surface.
Figure 6D:
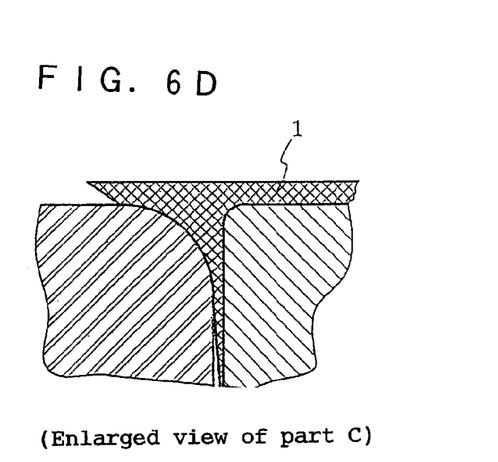
FIG. 6D is an enlarged view of part C shown in FIG. 6C.

FIG. 6A is an enlarged vertical section of a hole of a conventional electrodeposition drum. FIG. 6B is an enlarged view of part A shown in FIG. 6A, FIG. 6C shows the state where metal foil 1 is deposited on the drum surface and FIG. 6D is an enlarged view of part C shown in FIG. 6C. As shown in FIG. 6A, an insulating resin 2-3 is filled in a hole 2-2 of an electrodeposition drum 2. Through detailed observation of an opening edge thereof (the part A in the figure), there is found a clearance 8 (i.e., opening) between the inner surface of the hole 2-2 and the resin as shown in FIG. 6B. If the electrolytic deposition is carried out using this electrodeposition drum 2 as a cathode, the metal foil 1 is deposited in the clearance 8 as if a wedge is driven therein as seen in FIGS. 6C and 6D.

In peeling the thus-deposited metal foil 1 away from the electrodeposition drum 2, the foil in the clearance 8 functions as a lever to drag the resin 2-3 out of the hole 2-2 or gives resistance against the peeling of the metal foil 1, thereby causing a break of the metal foil 1 itself. Even if the peeling is carried out without dragging the resin 2-3 out or breaking the metal foil 1, the apertures of the resulting metal foil 1 become irregular, which is unfavorable as a porous metal foil product.

The clearance at the opening edge of the hole 2-2 as described above is caused by volume shrinkage of the resin 2-3 filled in the hole 2-2. As the resin 2-3, generally used is a thermoplastic resin such as polyethylene and polypropylene. The resin is fused by heating to be filled in the hole 2-2 and cooled to solidify. In the solidifying step, the volume shrinkage occurs to generate the above-mentioned clearance 8.

Figure 7A:
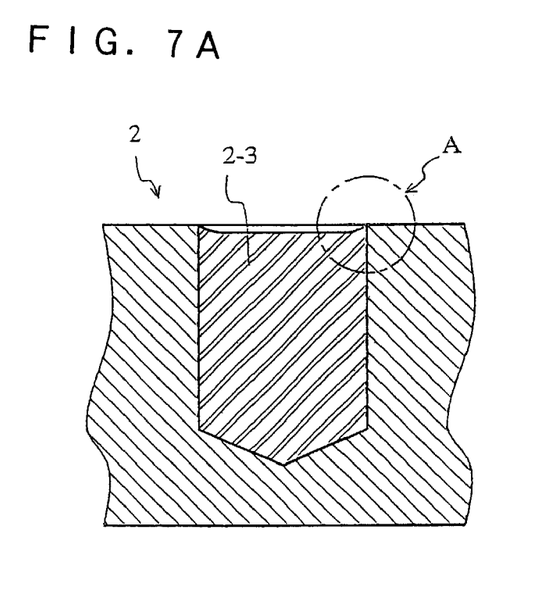
FIG. 7A is an enlarged vertical section of a hole of an electrodeposition drum according to the present invention.
Figure 7B:
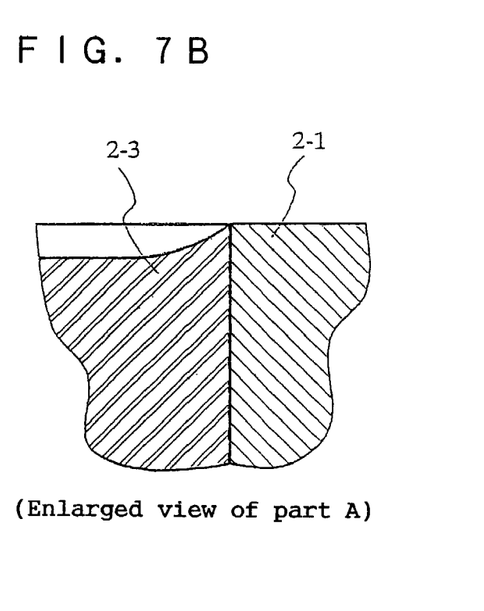
FIG. 7B is an enlarged view of part A shown in FIG. 7A.
Figure 7C:
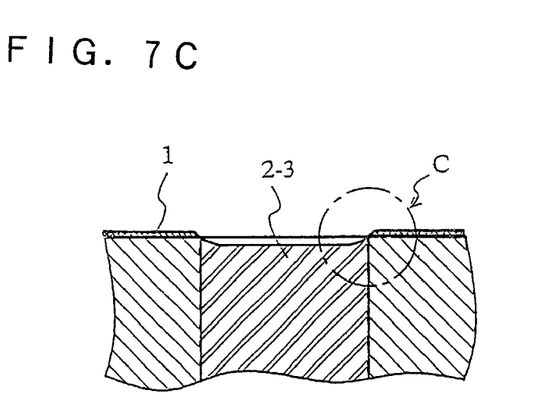
FIG. 7C is an enlarged vertical section illustrating a state where metal foil is deposited on the drum surface.
Figure 7D:
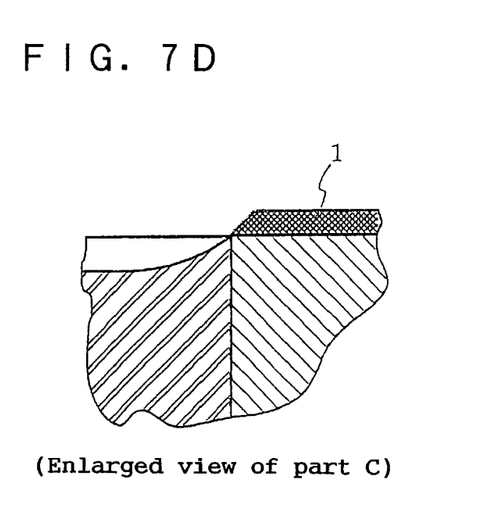
FIG. 7D is an enlarged view of part C shown in FIG. 7C.

FIG. 7A is an enlarged vertical section of a hole of the electrodeposition drum according to the present invention. FIG. 7B is an enlarged view of part A shown in FIG. 7A, FIG. 7C shows the state where the metal foil 1 is deposited on the drum surface and FIG. 7D is an enlarged view of part C shown in FIG. 7C. The clearance 8 as shown in FIG. 6A does not exist at the opening edge of the hole 2-2 of the electrodeposition drum 2. Accordingly, the phenomenon in which the deposited metal foil 1 cuts in as a wedge does not occur.

In order to obtain the shape of the opening edge shown in FIG. 7A, it is necessary for the resin 2-3 not to separate from the inner surface of the hole 2-2 as the result of shrinkage during solidification. In other words, it is sufficient that the adhesive force between the resin 2-3 and the inner surface of the hole 2-2 is greater than the peel stress on the resin 2-3 peeling off the inner surface wall as a result of shrinkage. In this case, even if the resin 2-3 causes the volume shrinkage during solidification, only the surface of the resin 2-3 retracts (i.e., is dented as shown in FIG. 7 and the clearance 8 from the inner surface wall of the hole 2-2 is not generated. The dent of the surface of the resin 2-3 does not cause any drawbacks to the electrolytic deposition process.

The resin to be filled in the holes of the electrodeposition drum of the present invention may be an epoxy resin and a silicone resin. In particular, the silicone resin is exceedingly favorable for the above-described object because it shows high adhesive force to metal and small volume shrinkage during curing. The filling of the silicone resin can be carried out by squeezing the resin into the holes using a roller or a spatula. Or alternatively, the drum and the resin are placed in a vessel, in which the pressure is reduced to bring the resin into the holes. The silicone resin is soft and plastic at normal temperature. After being filled as described above, the resin absorbs moisture in the air to cure. Heating may be carried out to promote the curing.

Figure 8:
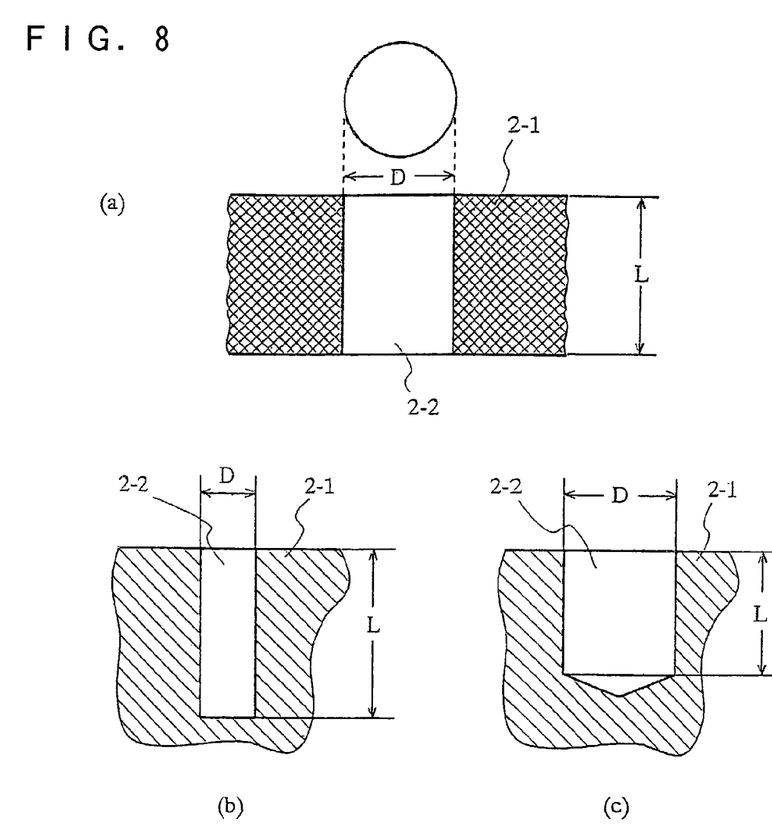
FIGS. 8 and 9 are diagrams illustrating examples of the shapes of the holes on the electrodeposition drum according to the present invention.

FIGS. 8(a) to 8(c) are diagrams illustrating examples of the shape of the hole. As shown in FIG. 8(a), the hole 2-2 may penetrate a base material 2-1 of the electrodeposition drum 2 or may have a bottom as shown in FIGS. 8(b) and 8(c). In either case, the ratio of depth L to diameter D (L/D) shall be at least 1. The reason is as follows.

As shown in the above-mentioned FIG. 7A, the drum of the present invention does not substantially cause the phenomenon in which the deposited metal cuts in between the resin 2-3 and the inner wall of the hole 2-2. However, since the deposition of metal occurs three-dimensionally, the metal extends over the resin 2-3 to some extent. Further, from an ultramicroscopic view, a minuscule clearance may be generated between the resin 2-3 and the inner wall of the hole 2-2 after long-term deposition. In such a case, the resin 2-3 may possibly be adhered to the metal foil 1 and separated during peeling the deposited metal foil 1.

To prevent the above-described separation of the resin 2-3, the adhesive force between the resin 2-3 and the inner surface of the hole 2-2 shall be greater than the adhesion between the resin 2-3 and the metal foil 1. As a result of many experiments based on this consideration, it is found that the adhesive force between the resin 2-3 and the inner surface of the hole 2-2 becomes sufficiently great and the separation of the resin 2-3 is almost completely prevented by setting the above-described L/D to at least 1. A greater L/D is preferable for preventing the separation, but it takes a lot of trouble with the production of the holes. Therefore, it is not necessary to set the L/D immoderately high and the upper limit may be set to about 5.

Figure 9:
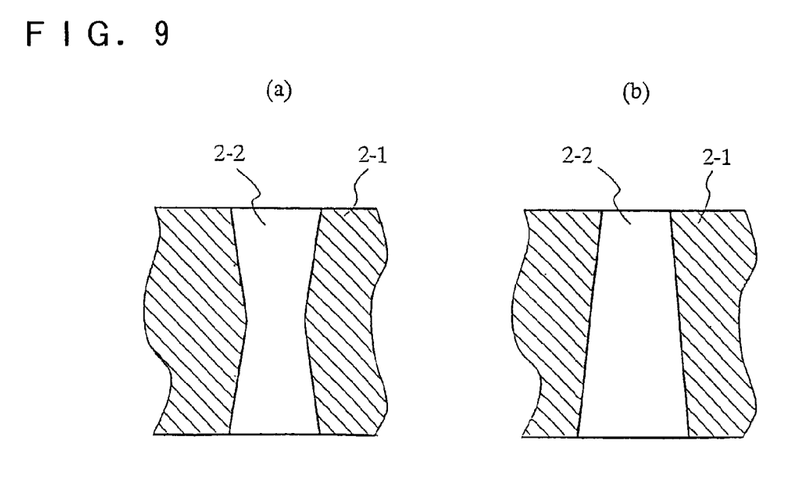

In order to increase the adhesive force between the resin 2-3 and the inner surface of the hole 2-2, it is also effective to give surface treatment such as chromate treatment, silane coupling treatment and titanate treatment to the surface of the electrodeposition drum 2. Further, as shown in FIGS. 9(a) and 9(b), the hole 2-2 may have the sectional form of an hourglass or a trapezoid tapered in an upward direction. Even in the case of combining these methods, the above-described L/D should be at least 1.

EXAMPLES

Example 1

Using an electrolytic deposition apparatus for producing continuous metal foil shown in FIG. 1, nickel foils different in thickness and hardness were formed.

An electrodeposition drum of the electrolytic deposition apparatus for producing a continuous metal foil is a hollow drum made of pure titanium (an electrodeposition drum of test No. 110 described later) having a diameter of 400 mm and a width of 200 mm (a width of an electrolytic deposition part: 120 mm). On the surface of the electrodeposition drum, holes of 1.5 mm diameter are bored at the hole rate of 30% in a staggered arrangement, into which an insulating resin is buried.

Among electrolysis conditions, kinds of electrolyte, kinds of additive, current density, pH of the electrolyte, temperature and rotation speed of the electrodeposition drum were varied. As the electrolyte, a Watts bath and a sulfamic acid bath of the following compositions were used.

| (A) Watts Bath: | nickel sulfate | 250 g/liter |
|---|---|---|
|  | nickel chloride | 45 g/liter |
|  | boric acid | 40 g/liter |

Additive: ACNA-HSB (a product of OKUNO CHEMICAL INDUSTRIES CO., LTD.)

| (b) Sulfamic acid bath: | nickel sulfamate | 350 g/liter |
|---|---|---|
|  | nickel chloride | 5 g/liter |
|  | boric acid | 40 g/liter |

Additive: NSF-E, NSF-X (both are products of NIHON KAGAKU SANGYO, Co., Ltd.)

The measurement results of thickness and hardness of the resulting porous nickel foils are shown in Table 1.

The thickness was measured with a micrometer. The thickness to be electrodeposited was adjusted within the range of 10-35 μm as specified by the present invention.

The hardness was measured by using a micro Vickers hardness tester on the foil surface with a measuring load of 10 g and a full load application time of 20 sec. The unit of hardness used in the present invention is the micro Vickers hardness measured under the above-described conditions.

TABLE 1

| | Conditions for electrolysis | | | | | | Left unchanged after electrolytic deposition | | Heat treatment after electrolytic deposition | | | |
|---|---|---|---|---|---|---|---|---|---|---|---|---|
| No. | Electrolytic bath | Additive | Current density A/dm² | pH | Temp. °C | Drum rotation speed cm/min | Electro-deposited thickness μm | Hardness Hv | Tensile strength Mpa | Temp. °C | Hardness Hv | Tensile strength Mpa | Class |
| 1 | Sulfamic | NSF-X | 10 | 3.5 | 50 | 11.2 | 10 | 110 | 583 | — | — | — | Ex. of the Invention |
| 2 | Acid |  | 25 | 3.5 | 50 | 14.0 | 20 | 108 | 572 |  |  |  | ,, |
| 3 | bath |  | 20 | 4.5 | 50 | 11.2 | 20 | 109 | 578 |  |  |  | ,, |
| 4 |  |  | 20 | 2.5 | 50 | 11.2 | 20 | 118 | 625 |  |  |  | ,, |
| 5 |  |  | 20 | 3.5 | 40 | 11.2 | 20 | 121 | 641 |  |  |  | ,, |
| 6 |  |  | 20 | 3.5 | 60 | 11.2 | 20 | 112 | 594 |  |  |  | ,, |
| 7 |  |  | 20 | 3.5 | 50 | 6.4 | 35 | 115 | 610 |  |  |  | ,, |

TABLE 1-continued

| No. | Electrolytic bath | Additive | Conditions for electrolysis | | | | | Electro-deposited thickness μm | Left unchanged after electrolytic deposition | | Heat treatment after electrolytic deposition | | | Class |
|---|---|---|---|---|---|---|---|---|---|---|---|---|---|---|
| | | | Current density A/dm² | pH | Temp. °C | Drum rotation speed cm/min | | | Hardness Hv | Tensile strength Mpa | Temp. °C | Hardness Hv | Tensile strength Mpa | |
| 8 | Sulfamic | NSF-E | 20 | 2.5 | 50 | 11.2 | | 20 | 388 | 2056 | 600 | 73 | | Ex. of the Invention |
| 9 | Acid | | 20 | 3.5 | 60 | 11.2 | | 20 | 355 | 1822 | 550 | 80 | | " |
| 10 | bath | | 20 | 3.5 | 50 | 6.4 | | 35 | 382 | 2025 | 600 | 78 | 378 | " |
| 11 | | | 10 | 3.5 | 50 | 11.2 | | 10 | 418 | 2216 | 900 | 50 | | Com. Ex. |
| 12 | | | 25 | 3.5 | 50 | 14.0 | | 20 | 385 | 2041 | 800 | 53 | | " |
| 13 | | | 20 | 4.5 | 50 | 11.2 | | 20 | 366 | 1940 | 700 | 57 | | " |
| 14 | | | 20 | 3.5 | 40 | 11.2 | | 20 | 378 | 2003 | 500 | 131 | | " |
| 15 | Sulfamic | None | 10 | 3.5 | 50 | 5.6 | | 20 | 188 | 996 | 500 | 130 | | Ex. of the Invention |
| 16 | Acid | | 20 | 3.5 | 50 | 11.2 | | 20 | 155 | 821 | 600 | 75 | 296 | " |
| 17 | bath | | 20 | 4.5 | 50 | 11.2 | | 20 | 145 | 769 | 600 | 73 | | " |
| 18 | | | 20 | 3.5 | 40 | 11.2 | | 20 | 165 | 875 | 550 | 80 | | " |
| 19 | | | 20 | 3.5 | 60 | 11.2 | | 20 | 144 | 763 | 500 | 128 | | " |
| 20 | Sulfamic | None | 20 | 3.5 | 50 | 6.4 | | 35 | 154 | 816 | 450 | 130 | | Ex. of the Invention |
| 21 | Acid | | 25 | 3.5 | 50 | 14.0 | | 20 | 150 | 795 | 700 | 55 | | Com. Ex. |
| 22 | bath | | 20 | 2.5 | 50 | 11.2 | | 20 | 161 | 853 | 800 | 52 | | " |
| 23 | | | 20 | 3.5 | 50 | 22.4 | | 10 | 152 | 806 | 400 | 150 | | " |
| 24 | Watts | None | 5 | 3.5 | 50 | 2.8 | | 20 | 180 | 954 | 650 | 130 | | Ex. of the Invention |
| 25 | bath | | 10 | 3.5 | 50 | 5.6 | | 20 | 265 | 1405 | 700 | 125 | | " |
| 26 | | | 20 | 3.5 | 50 | 11.2 | | 20 | 296 | 1569 | 800 | 100 | 315 | " |
| 27 | | | 25 | 3.5 | 50 | 14.0 | | 20 | 305 | 1617 | 900 | 80 | | " |
| 28 | | | 20 | 4.5 | 50 | 11.2 | | 20 | 300 | 1590 | 800 | 98 | | " |
| 29 | | | 20 | 2.5 | 50 | 11.2 | | 20 | 283 | 1500 | 800 | 97 | | " |
| 30 | | | 20 | 3.5 | 40 | 11.2 | | 20 | 302 | 1600 | 800 | 102 | | " |
| 31 | | | 20 | 3.5 | 60 | 11.2 | | 20 | 285 | 1510 | 800 | 99 | | " |
| 32 | | | 20 | 3.5 | 50 | 6.4 | | 35 | 288 | 1526 | 800 | 100 | 309 | " |
| 33 | | | 20 | 3.5 | 50 | 22.4 | | 10 | 286 | 1516 | 800 | 101 | | " |
| 34 | Watts | ACNA-HSB | 10 | 3.5 | 50 | 5.6 | | 20 | 136 | 721 | 700 | 128 | | Ex. of the Invention |
| 35 | bath | | 20 | 4.5 | 50 | 22.4 | | 10 | 140 | 742 | 800 | 85 | | " |
| 36 | | | 20 | 2.5 | 50 | 6.4 | | 35 | 130 | 689 | 800 | 83 | 304 | " |
| 37 | | | 20 | 3.5 | 40 | 11.2 | | 20 | 142 | 753 | 800 | 88 | | " |
| 38 | | | 20 | 3.5 | 60 | 11.2 | | 20 | 145 | 769 | 900 | 87 | | " |
| 39 | | | 25 | 3.5 | 50 | 14.0 | | 20 | 142 | 753 | 600 | 135 | | Com. Ex. |

As apparent from Table 1, the nickel foils (Nos. 1-7) left unchanged after the electrolytic deposition from the electrolyte of sulfamic acid bath added with NSF-X showed the Vickers hardness of 121 or less.

The nickel foils (Nos. 8-14) electrodeposited from the electrolyte of sulfamic acid bath added with NSF-E showed the Vickers hardness of 355-418 after the electrolytic deposition. However, by heat treatment at a temperature in the range of 550-600° C. as given to the foils of Nos. 8-10, the Vickers hardness was adjusted to 73-80 (the range specified by the present invention).

The nickel foils (Nos. 15-23) electrodeposited from the sulfamic acid bath without additives showed the Vickers hardness of 144-188 after the electrolytic deposition. However, by heat treatment at a temperature in the range of 450-600° C. as given to the foils of Nos. 15-20, the Vickers hardness was adjusted to 73-130 (the range specified by the present invention).

The nickel foils (Nos. 24-33) electrodeposited from the Watts bath without additives showed the Vickers hardness of 180-305 after the electrolytic deposition. However, by giving heat treatment at a temperature in the range of 650-900° C., the Vickers hardness was adjusted to 80-130 (the range specified by the present invention).

The nickel foils (Nos. 34-39) electrodeposited from the electrolyte of Watts bath added with ACNA-HSB showed the Vickers hardness of 130-145 after the electrolytic deposition. However, by heat treatment at a temperature in the range of 700-900° C. as given to the foils of Nos. 34-38, the Vickers hardness was adjusted to 83-128 (the range specified by the present invention).

Example 2

Using the apparatus shown in FIG. 1, tests for the production of nickel foil (thickness: 20 μm, aperture rate: 50%) were carried out. The electrodeposition drum was a hollow cylinder made of pure titanium having a diameter of 400 mm, a width of 200 mm and a thickness of 10 mm. Holes were closed-end straight holes having 3 types of diameters of 1.0 mm, 1.5 mm and 2.0 mm and a depth varied as shown in Table 2. The holes were arranged in a staggered pattern as shown in FIG. 2, into which resins indicated in Table 2 were filled.

The electrolyte was the Watts bath of the above-described (A) showing pH of 3.5 and temperature of 50° C. The electrolytic deposition was carried out at a current density of 20 A/dm².

The rotation speed of the electrodeposition drum was 0.13 m/min and the deposited nickel foil was peeled off continuously. The performance of the electrodeposition drum was evaluated from the length that allowed continuous peeling (the length obtained until the foil was torn) and whether the foil shape is good or bad. The results are shown in Table 2.

TABLE 2

| Test No. | Size of the drum hole | | | Kind of resin filled in the hole | Length of continuously peeled foil (m) | Foil shape and main cause of the foil break | Remarks |
| --- | --- | --- | --- | --- | --- | --- | --- |
| | Diameter D (mm) | Depth L (cm) | L/D | | | | |
| 101 | 1.0 | 0.8 | 0.8 | Polyvinyl chloride | 0 | Foil break at the aperture | Comparative |
| 102 | 2.0 | 1.5 | 0.75 | Silicone resin | 50 or less | Shape defect at the length of about 50 m | Examples |
| 103 | 1.5 | 3.0 | 2 | Polyethylene | 20 or less | Separation of resin (defect in foil shape) | |
| 104 | 1.0 | 4.0 | 4 | Polypropylene | 20 or less | Same as the above | |
| 105 | 2.0 | 1.5 | 0.75 | Vulcanized rubber | 2 or less | Foil break at the aperture | |
| 106 | 1.0 | 1.0 | 1 | Silicone resin | 100 or more | Good shape | Examples of |
| 107 | 1.0 | 5.0 | 5 | Silicone resin | 100 or more | Good shape | the Invention |
| 108 | 1.0 | 2.0 | 2 | Epoxy resin | 100 or more | Good shape | |
| 109 | 2.0 | 10.0 | 5 | Epoxy resin | 100 or more | Good shape | |
| 110 | 1.5 | 3.0 | 2 | Epoxy resin | 100 or more | Good shape | |
| 111 | 1.0 | 5.0 | 5 | Silicone resin | 100 or more | Good shape | |
| 112 | 1.0 | 2.0 | 2 | Silicone resin | 100 or more | Good shape | |

As seen in Table 2, continuous foils of 100 m or longer were produced in the examples in which the L/D of the holes was at least 1 and a silicone resin or an epoxy resin was filled in the holes. The foils were exceedingly favorable as finished products with the holes shaped regularly. An examination of the electrodeposition drum showed that the resin filled in the holes was not separated at all and almost no clearance existed between the resin and the inner surface of the hole. On the other hand, in examples (tests Nos. 101 and 105) in which the electrodeposition drums with the holes filled with polyvinyl chloride or vulcanized rubber were used, the foils were torn immediately after the peeling was started. In these electrodeposition drums, a considerably large clearance was generated between the resin and the inner surface of the hole, into which nickel was electrodeposited.

Even if the silicone resin was used, the separation of the resin occurred in test No. 102 where the L/D was less than 1, which caused defects in the foil shape when the foil length reached about 50 mm. In examples where polyethylene or polypropylene was used (Nos. 103, 104), the L/D was 1 or more but the separation of the resin occurred since the adhesive force of the resin itself was poor.

From the above-described results, it is indicated that it is important to set the L/D of the holes to at least 1 and properly select the kind of the resin to be filled in the holes.

INDUSTRIAL APPLICABILITY

The porous nickel foil according to the present invention has a small hardness and hence is easily deformed in press-bonding the active material thereto. Therefore, the foil is excellent in supporting the active material. Further, since the tensile strength is high, the foil is not torn in handling and transfer.

With the use of the electrodeposition drum according to the present invention, the porous metal foil can be produced continuously by the electrolytic deposition method. Not only the porous nickel foil, porous foils of copper, iron and alloys thereof can also be formed in a thickness as small as about 5 µm.

The invention claimed is:

1. A method for producing a porous nickel foil for a negative electrode of an alkaline battery comprising the steps of producing porous nickel foil of 10-35 µm thick by an electrolytic deposition method and softening or annealing the porous nickel foil such that the porous nickel foil has a Vickers hardness of 70-130, said electrolytic deposition method in said step of producing porous nickel foil includes the step of depositing nickel foil on a surface of an electrodeposition drum having holes filled with insulating resin, wherein the nickel foil includes through-holes formed at positions corresponding to the insulating resin, wherein the ratio of depth L and diameter D (L/D) of the hole filled with insulating resin is at least 1 and no clearance, into which deposited metal otherwise cuts in a wedge shape, wherein no opening exists at the boundary between the insulating resin filled in the hole and an opening edge of the hole.

2. The method according to claim 1, wherein the softening or annealing is carried out at a temperature of 450-900° C.

* * * * *